C. R. PATTERSON.
MUSIC LEAF TURNER.
APPLICATION FILED MAY 15, 1917.

1,258,443.

Patented Mar. 5, 1918.
3 SHEETS—SHEET 1.

WITNESSES
Jas. K. McCathran
Chas. H. Kesler

INVENTOR
Clyde R. Patterson,
BY
E. G. Siggers
ATTORNEY

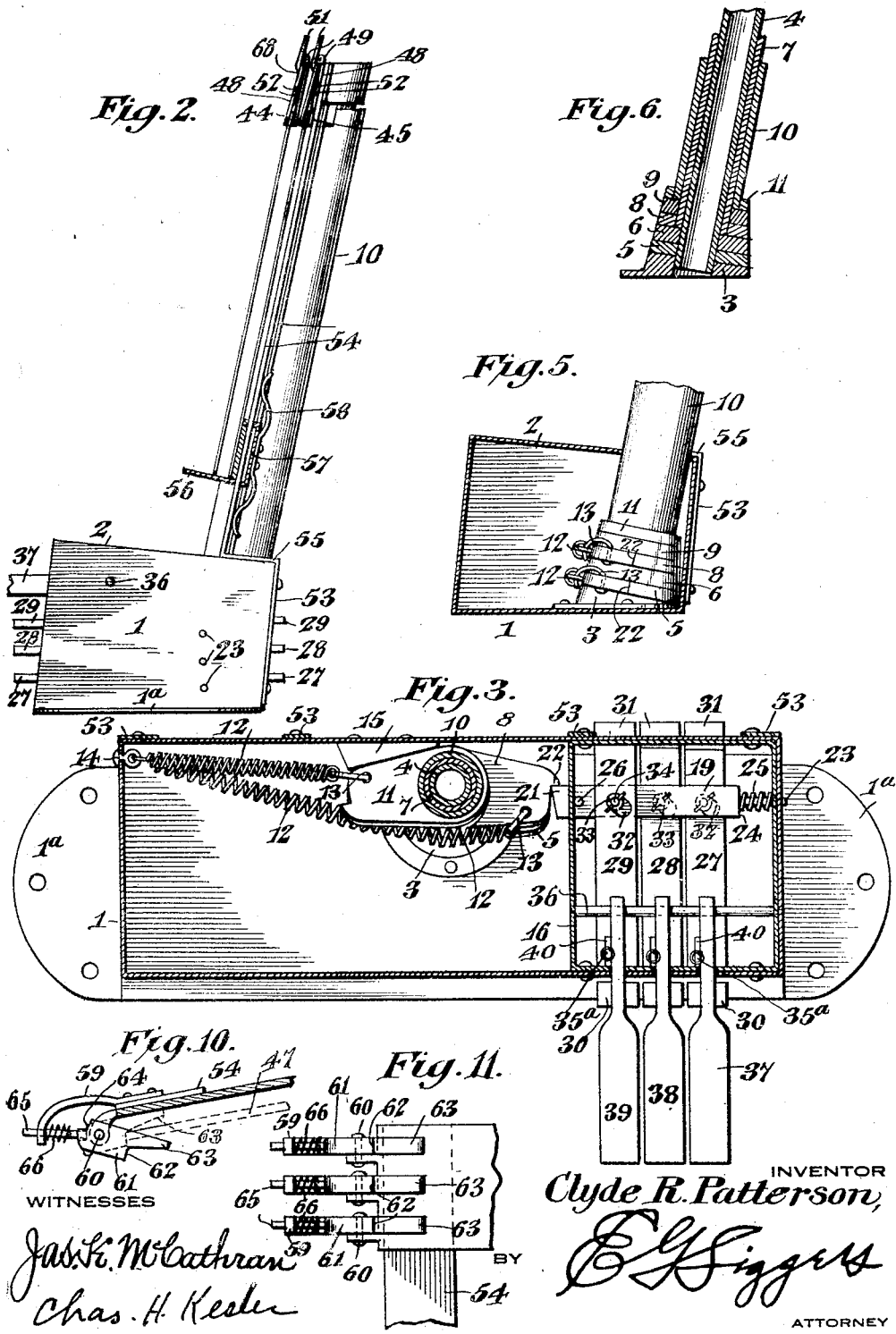
C. R. PATTERSON.
MUSIC LEAF TURNER.
APPLICATION FILED MAY 15, 1917.
1,258,443.
Patented Mar. 5, 1918.
3 SHEETS—SHEET 2.
INVENTOR
Clyde R. Patterson,
ATTORNEY

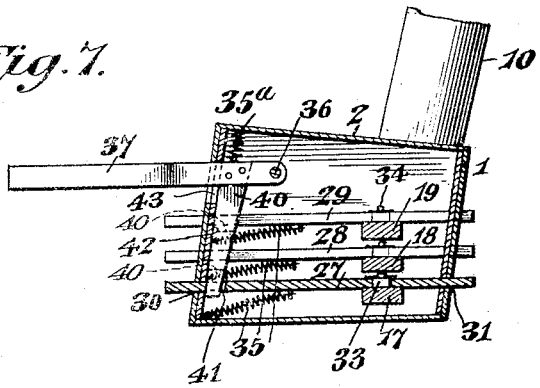

UNITED STATES PATENT OFFICE.

CLYDE R. PATTERSON, OF RIVERSIDE, CALIFORNIA.

MUSIC-LEAF TURNER.

1,258,443.  Specification of Letters Patent.  Patented Mar. 5, 1918.

Application filed May 15, 1917. Serial No. 168,714.

*To all whom it may concern:*

Be it known that I, CLYDE R. PATTERSON, a citizen of the United States, residing at Riverside, in the county of Riverside and State of California, have invented a new and useful Music-Leaf Turner, of which the following is a specification.

The invention relates to music leaf turners.

An object of the invention is to provide a construction for the purpose stated which can be easily and quickly operated by the hand or foot to swing the leaves from one side to the other.

Another object of the invention is to provide a construction in which the leaves will be supported at the proper angle to the eye of the musician.

Another object of the invention is to provide a construction in which the vibration of the leaves and clamps, after being moved from one side to the other, is prevented.

In the accompanying drawings I have illustrated one embodiment of the invention, in which:—

Fig. 2 is a side elevation.

Fig. 3 is a horizontal sectional view on the line 3—3 of Fig. 1, looking in the direction of the arrow.

Fig. 5 is a vertical sectional view on the line 5—5 of Fig. 1, looking in the direction of the arrow.

Fig. 6 is a vertical sectional view on the line 6—6 of Fig. 1, looking in the direction of the arrow.

Fig. 7 is a vertical sectional view on the line 7—7 of Fig. 1, looking in the direction of the arrow.

Fig. 8 is a detail perspective view of a slide bar.

Fig. 9 is a detail perspective view of a detent.

Fig. 10 is a detail plan view of means for preventing the vibration of the clamps and leaves after being turned.

Fig. 11 is a detail front elevation of the construction shown in Fig. 10.

Fig. 12 is a side elevation illustrating means for operating the music leaf turner by means of the foot.

Fig. 13 is a front elevation of the lower portion of the construction shown in Fig. 12.

Fig. 14 is a fragmentary elevation of the frame showing the leaf clamp catches.

Figure 1:
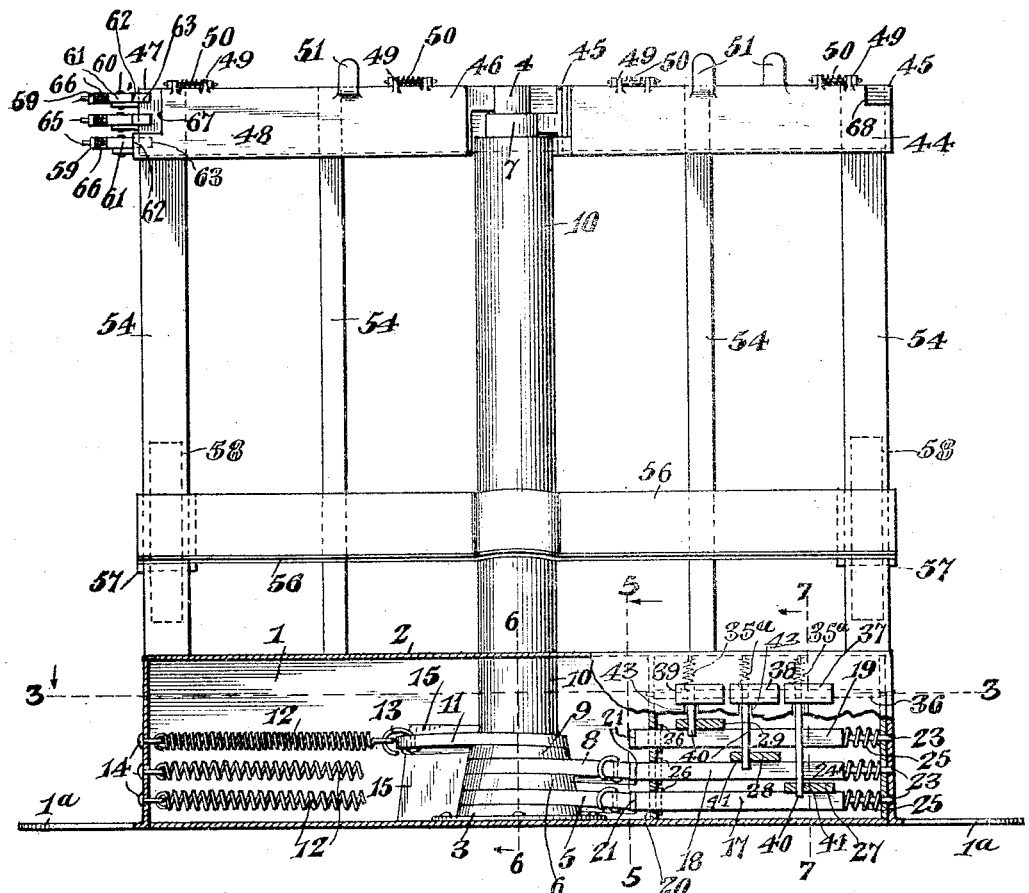
Figure 1 is a front elevation with parts of the casing broken away and in section.

Referring to Fig. 1, I have there shown a casing 1 of any suitable shape and provided with horizontally extending lower ears 1ᵃ, whereby it may be secured to a support. The top 2 of the casing is preferably inclined as shown in Fig. 2, whereby it may serve as a support for the music, if so desired.

Fixed to the interior of the casing, at the bottom and rear thereof, is a socket 3 constituting a bearing to receive a vertically extending tubular shaft 4. To the lower end of the shaft 4 is fixed a crank or arm 5. Encircling the shaft 4 and mounted above the arm 5 is a washer 6. Supported at its lower end by the washer 6 and encircling the shaft 4, is an intermediate tubular shaft 7, likewise provided at its lower end with a crank or arm 8. Encircling the shaft 7 and resting upon the arm 8 is a second washer 9. Resting upon the washer 9 and encircling the shaft 7 is an outside tubular shaft 10 provided at its lower end with a crank 11. The construction above described is clearly shown in Figs. 1, 3 and 6, and the cranks or arms 5, 8 and 11 are arranged one above the other in superposed relation. In Figs. 1 and 3, the arms or cranks 5 and 8 are shown at one side thereof or in a position of detention, while the arm or crank 11 is shown released and upon the opposite side of the figures.

A spring 12 is connected at one end 13 to the outer portion of each crank and connected at its opposite end, as indicated at 14, to a part of the casing. These springs exert a tension upon the cranks causing them to swing from one side to the other, as for instance, from the right hand side of Fig. 1, around to the left hand side, and thereby rotating the tubular shafts 4, 7 and 10 upon their axes, for a purpose to be more fully described hereinafter. As clearly shown in Fig. 3, this movement of the cranks is limited and the impact thereof is taken up by means of a buffer 15 fixed to the rear wall of the casing.

Referring to Fig. 3, a partition 16 extends transversely thereof adjacent one end. Slidably mounted within the partition 16 are horizontal detents 17, 18 and 19 arranged one above the other, sliding in suitable openings 20 in the partition and provided with noses 21 adapted to engage notches 22 upon the outer ends of the cranks. The ends of the detents remote from the noses 21 are provided with pins 23 slidably mounted within an end wall of the casing 1. Interposed between the casing and the end 24 of each detent is a spring 25, whereby the nose of the detent is held normally projected, retaining the cranks in the position shown in Fig. 3, with the springs 12 under tension. When the detents 17, 18 and 19 are retracted, the cranks will be released and the tubular shafts will swing around their axes turning the sheets of music. Suitable pins 26 are provided at the forward ends of the detents and act as stops to prevent the springs 25 from forcing the detents too far toward the cranks thereby limiting their inward movement.

The detents are intended to be individually and independently actuated to retract the same. For this purpose, I have provided horizontal slides or actuating bars 27, 28 and 29 arranged at right angles to the detents 17, 18 and 19 and slidably supported at their ends 30 and 31 in the front and back of the casing 1. In the construction here shown, the slide 27 is arranged over the detent 17, the slide 28 over the detent 18 and the slide 29 over the detent 19. Each slide or actuating bar is provided above its detent with an inclined slot 32. The detent is provided with a roller 33 riding within the slot 32 and journaled upon a pin 34 fixed to the detent. The slot 32 is so arranged that when the slide or actuating bar is moved rearwardly, the detent will be moved or retracted out of engagement with its crank. The slides 27, 28 and 29 are held normally in a forward position by means of springs 35 connecting them to the casing, as shown in Fig. 7.

Mounted above the actuating bars or slides 27, 28 and 29 and extending at right angles thereto is a fixed shaft 36. Levers or keys 37, 38 and 39 arranged outside of the casing and projecting into the same are pivoted at their inner ends to the rod 36. These keys are for actuating the slide bars, and for this purpose are each provided with a downwardly extending wedge-shaped nose 40 slidably engaging or projecting into a slot 41 upon one of the slides or actuating bars. One edge of each nose 40 is in engagement with the inside of the front wall of the casing, as shown at 42 in Fig. 7. The casing is likewise provided with vertically extending slots 43 through which the keys or actuating levers 37, 38 and 39 extend. Each key, as clearly shown in Fig. 7, is furnished with a spring 35$^a$ for normally retaining it in elevated position.

In the illustration here made, I have provided a construction adapted for turning three leaves successively. It is to be understood, however, that any number of cranks or leaf-turning devices may be used. Furthermore, each crank is provided with its own individual detent. Each detent has its own slide or actuating bar, and each actuating bar is provided with its own individual key or actuating lever. It will, therefore, be seen that the cranks may be individually and successively released by imparting downward movement to the keys.

As illustrated in Fig. 1, horizontally extending clamps 44, 45 and 46 are fixed to the upper ends of the tubular shafts 4, 7 and 10, the inner shafts projecting beyond the outer shaft to enable the clamps to be attached. That is to say the shaft 4 at its upper end projects beyond the upper end of the shaft 7 and likewise the upper end of the latter projects beyond the upper end of the outer shaft 10 so that the clamps 44, 45 and 46 will engage therewith, the same being fastened thereto in any suitable manner. Each clamp is arranged substantially parallel with the crank of its tubular shaft and comprises an inner member or jaw 47 fixed to a tubular shaft and an outer adjustable member or jaw 48. The jaw 48 is pivoted along its upper edge, as indicated at 49 to the fixed jaw or member 47. The jaws tend normally to move into engagement with each other by reason of the springs 50 connected to the pivots in a well known manner. Thumb pieces 51 are provided upon the adjustable clamping jaws 48, whereby they may be moved around their pivots to clamp and unclamp the upper edges of the music leaves. It will be noticed, looking at Fig. 1, that the thumb pieces are arranged out of alinement with each other so that they may be easily manipulated independently, without interfering with each other. It will be seen that the clamps are of substantial length, so that they can engage the major portion of the upper edge of the music leaves or sheets, whereby danger of tearing the sheets is to a large measure prevented. The adjacent sides of the clamping jaws are protected with layers of cloth 52 to prevent the paper from being torn or damaged.

As shown in Fig. 2, the axes of the tubular shafts 4, 7 and 10 incline rearwardly and upwardly approximately twenty degrees from the vertical thereby providing a support for the music book or sheet of music arranged at a proper angle. Fixed to the rear of the casing 1, as indicated at 53 are upwardly and rearwardly extending uprights 54 having intermediate portions 55 bent rearwardly and resting upon the top of the casing 1. The uprights 54 constitute a back for the music, inclined at the same angle as the shafts 4, 7 and 10 and in substantial alinement with the shafts at each side. The uprights 54 are provided with a vertically adjustable supporting shelf or ledge 56 for the music having at each end sleeves 57 slidably mounted upon the end uprights 54. Springs 58 are attached intermediate their ends to the rear portion of the sleeves 57 and engage the uprights 54 at the rear, thereby frictionally holding the shelf 56 in any position of adjustment it may happen to be.

As shown more clearly in Figs. 10 and 11, I have provided means for engaging the outer ends of the clamps as they swing around, and thereby catching and locking them in position to prevent their vibration and the vibration of their sheets, after they have swung from one side to the other to turn the leaves. For this purpose, the upper end of the left hand upright 54 is provided with brackets 59 arranged one slightly in advance of the other from the lower to the uppermost bracket to which are pivoted intermediate their ends and near the ends adjacent to the brackets 59 at 60 catches 61, having forward notches 62 upon their long arms and fingers 63 constituting the backs of the catches and inner notches 64 upon their short arms. Pins 65 are normally held in engagement with the catches 61 by means of springs 66.

The operation of this last described device is substantially as follows: When one of the clamps swings around from one side to the other, the outer end thereof will engage the finger 63 swinging it rearwardly, whereby the forward portion of the notch 62 will tightly engage the end of the clamp. At the same time, the pins 65 will move into the notch 64 holding the catch substantially immovable and thereby preventing the vibration of the clamp. As shown in Fig. 1, the catches 61 are arranged in superimposed relation, one above the other, and certain of the clamps, as indicated at 67 and 68, are cut away so that one clamp will not interfere with the proper operation of the catching devices for the other clamps.

Figure 4:
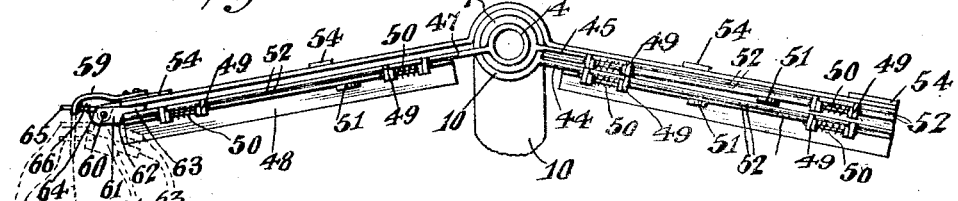
Fig. 4 is a plan view looking at the upper end of the music leaf turner.

By referring to Fig. 4, it will be seen that the clamps, in swinging around the axes of the tubular shafts from one side to the other, swing through an arc less than 180 degrees. The object of this is to so arrange the limits of motion that the music at each side will be arranged at right angles to the line of vision of the musician. The point at one side to which the clamps will go is determined by the buffer 15 and upon the opposite side by the position of the detents 17, 18 and 19. The angle or arc which the clamps can describe in moving from one side to the other can be varied, but the angle may be around 157 degrees.

In Figs. 12 and 13, I have shown a construction by which the keys or actuating levers may be operated by the foot. In the construction there shown, a music leaf turner 69 of the construction above described and having keys 70 (one of which is shown) at the front thereof is supported by means of a bracket 71 and clamped thereto by means of a set screw 72. Resting upon the floor is a frame 73. Slidably mounted within the frame 73 are vertically extending rods 74 which are pivotally connected at their upper ends 75 to the keys 70. Pedals 76 are pivotally connected at one end 77 to the lower ends of the rods 74 and at their opposite ends 78 to the frame 73. The rods 74 and the pedals are retained in elevated position by means of springs 79 interposed between the frame 73 and collars 80 upon the rods 74. It will be seen, therefore, that when the pedals 76 are depressed, the keys 70 or the keys 37, 38 and 39 of the construction shown in Fig. 3, will thereby be depressed, allowing the music leaves to turn.

While I have shown and described one embodiment of my invention, it is to be understood that I do not desire to be limited to the details of construction herein shown and described, for obvious modifications will be apparent to anyone skilled in the art.

What is claimed is:—

1. In a music leaf turner, a casing, leaf turning mechanism supported thereby, spring controlled cranks for actuating said mechanism, slidable detents for engaging the cranks to normally hold the same, slides disposed crosswise of said detents for actuation upon the latter to move the same, and swinging keys projected exteriorly of the casing and having depending noses engaging the slides to move the same on depression of said keys for the release of the detents from the cranks.

2. In a music leaf turner, a casing, a leaf turning mechanism supported thereby, spring controlled cranks for actuating said mechanism, slidable detents for engaging the cranks to normally hold the same, slides disposed crosswise of said detents and having diagonal slots, rollers journaled on the detents and engaged in the slots, and swinging keys projecting exteriorly of the casing at its front and having depending noses engaging the slides to move the same on depression thereof for the release of the detents from the cranks.

3. In a music leaf turner, a leaf turning mechanism supported thereby, spring controlled cranks for actuating said mechanism, slidable detents for engaging the cranks to normally hold the same, slides disposed crosswise of said detents and having diagonal slots, rollers journaled on the detents and engaged in the slots, swinging keys projected exteriorly of the casing at its front and having depending noses engaging the slides to move the same on depression thereof for the release of the detents from the cranks, and a buffer arranged interiorly of the casing in the path of movement of the cranks to limit the throw thereof in one direction when released by the detents.

4. In a music leaf turner, a leaf turning mechanism supported thereby, spring controlled cranks for actuating said mechanism, slidable detents for engaging the cranks to normally hold the same, slides disposed crosswise of said detents and having diagonal slots, rollers journaled on the detents and engaged in the slots, swinging keys projecting exteriorly of the casing at its front and having depending noses engaging the slides to move the same on depression thereof for the release of the detents from the cranks, a buffer arranged interiorly of the casing in the path of movement of the cranks to limit the throw thereof in one direction when released by the detents, guide pins on the detents and slidable through a wall of the casing, and springs surrounding the pins and acting against the detents to normally hold the same engaged with the cranks.

5. In a music leaf turner, a leaf turning mechanism supported thereby, spring controlled cranks for actuating said mechanism, slidable detents for engaging the cranks to normally hold the same, slides disposed crosswise of said detents and having diagonal slots, rollers journaled on the detents and engaged in the slots, swinging keys projected exteriorly of the casing at its front and having depending noses engaging the slides to move the same on depression thereof for the release of the detents from the cranks, a buffer arranged interiorly of the casing in the path of movement of the cranks to limit the throw thereof in one direction when released by the detents, guide pins on the detents and slidable through a wall of the casing, springs surrounding the pins and acting against the detents to normally hold the same engaged with the cranks, and means active upon the keys to normally hold the same in raised position.

6. In a music leaf turner, a casing, a frame rising from the casing, leaf turning mechanism supported by the casing and having leaf engaging clamps, means for controlling the mechanism for the automatic swinging of the clamps from right to left of the frame when said mechanism is released, brackets fixed to the frame at the upper left hand corner thereof, catches pivoted in the brackets and each having long and short arms, the long arms being notched and engageable by the clamps, and spring-held tripping pins, the short arms being notched and engaged by the tripping pins to hold the catches engaged with the clamps on the automatic tripping thereof by the latter.

7. In a music leaf turner, leaf turning mechanism, a bracket fixed at one side of the path of movement of the leaf turning mechanism, a catch pivoted in the bracket and having long and short arms, the long arm being notched and engageable by the leaf turning mechanism, and spring held tripping means carried by the bracket, the short arm being notched and engaged by the tripping means to hold the catch engaged with the leaf turning mechanism on the automatic tripping thereof by the latter.

8. In a music leaf turner, leaf turning means, a frame, means for latching the leaf turning means, said means including a bracket fixed to the frame at one side of the path of movement of the leaf turning means, a catch pivotally supported by the frame and having long and short arms, the long arm being notched and engageable by the leaf turning means, a pin slidable through the bracket and adapted to engage with the short arm to hold the catch engaged with the leaf turning means on the automatic tripping thereof by the lock, and a spring active upon the pin to move the same into position for engagement with the short arm.

In testimony, that I claim the foregoing as my own, I have hereto affixed my signature in the presence of two witnesses.

CLYDE R. PATTERSON.

Witnesses:
 Ivy McCord,
 Geo. A. Sacan.

Copies of this patent may be obtained for five cents each, by addressing the "Commissioner of Patents, Washington, D. C."